(12) United States Patent
Albert et al.

(10) Patent No.: US 10,955,091 B2
(45) Date of Patent: Mar. 23, 2021

(54) TANK VALVE

(71) Applicant: Daimler AG, Stuttgart (DE)

(72) Inventors: Simone Albert, Neidlingen (DE); Fabian Gall, Albstadt (DE); Philipp Hausmann, Kirchheim (DE)

(73) Assignee: Daimler AG, Stuttgart (DE)

( * ) Notice: Subject to any disclaimer, the term of this patent is extended or adjusted under 35 U.S.C. 154(b) by 112 days.

(21) Appl. No.: 16/314,080

(22) PCT Filed: Jun. 28, 2017

(86) PCT No.: PCT/EP2017/000767
§ 371 (c)(1),
(2) Date: Dec. 28, 2018

(87) PCT Pub. No.: WO2018/001561
PCT Pub. Date: Jan. 4, 2018

(65) Prior Publication Data
US 2019/0170303 A1   Jun. 6, 2019

(30) Foreign Application Priority Data

Jul. 1, 2016  (DE) .................. 10 2016 008 442

(51) Int. Cl.
*F17C 13/04* (2006.01)

(52) U.S. Cl.
CPC ...... *F17C 13/04* (2013.01); *F17C 2201/0109* (2013.01); *F17C 2201/056* (2013.01); *F17C 2201/058* (2013.01); *F17C 2205/0134* (2013.01); *F17C 2205/035* (2013.01); *F17C 2205/0317* (2013.01); *F17C 2205/0326* (2013.01); *F17C 2205/0329* (2013.01); *F17C 2205/0332* (2013.01);
(Continued)

(58) Field of Classification Search
CPC .................. F17C 13/04; F17C 2270/0184
See application file for complete search history.

(56) References Cited

U.S. PATENT DOCUMENTS

| 5,785,073 A * | 7/1998 | Gordon et al. | ........... E03B 7/10 137/468 |
| 5,992,219 A | 11/1999 | Otaka | |

(Continued)

FOREIGN PATENT DOCUMENTS

| DE | 698 22 006 T2 | 6/2004 |
| DE | 103 62 052 A1 | 9/2005 |

(Continued)

OTHER PUBLICATIONS

PCT/EP2017/000767, International Search Report dated Oct. 17, 2017 (Two (2) pages).

(Continued)

*Primary Examiner* — Kevin L Lee
(74) *Attorney, Agent, or Firm* — Crowell & Moring LLP

(57) ABSTRACT

A tank valve for installation on a compressed gas container has a base body having a shared gas connection for refueling/extraction which is divided inside the base body into a refueling line and an extraction line as part of an extraction path, and has an extraction valve in the extraction line. The tank valve has a check valve disposed in the extraction path in series with the extraction valve, blocking the flow against the flow direction when gas is extracted.

13 Claims, 3 Drawing Sheets

(52) U.S. Cl.
CPC .......... *F17C 2205/0335* (2013.01); *F17C 2205/0341* (2013.01); *F17C 2205/0385* (2013.01); *F17C 2205/0391* (2013.01); *F17C 2205/0394* (2013.01); *F17C 2221/012* (2013.01); *F17C 2221/033* (2013.01); *F17C 2223/0123* (2013.01); *F17C 2223/036* (2013.01); *F17C 2225/045* (2013.01); *F17C 2250/0439* (2013.01); *F17C 2260/012* (2013.01); *F17C 2260/018* (2013.01); *F17C 2260/042* (2013.01); *F17C 2265/066* (2013.01); *F17C 2270/0178* (2013.01); *F17C 2270/0184* (2013.01); *Y02E 60/32* (2013.01)

(56) References Cited

U.S. PATENT DOCUMENTS

| 7,722,009 | B2 | 5/2010 | Perthel et al. | |
|---|---|---|---|---|
| 10,337,643 | B2 * | 7/2019 | Hausmann | F16K 31/508 |
| 2008/0289700 | A1 | 11/2008 | Masingale | |
| 2009/0146094 | A1 | 6/2009 | Suzuki et al. | |
| 2014/0174574 | A1 | 6/2014 | Lhymn et al. | |

FOREIGN PATENT DOCUMENTS

| DE | 10 2013 015 515 A1 | | 3/2015 |
| DE | 10 2013 019 879 A1 | | 5/2015 |
| EP | 0 496 091 A1 | | 7/1992 |
| EP | 1 682 801 B1 | | 7/2006 |
| EP | 2354564 | * | 8/2011 |
| JP | 2009-168165 A | | 7/2009 |
| JP | 2013-53659 A | | 3/2013 |
| JP | 2014-1772 A | | 1/2014 |

OTHER PUBLICATIONS

German Search Report issued in German counterpart application No. 10 2016 008 442.1 dated Aug. 17, 2017, with Statement of Relevancy (Nine (9) pages).

* cited by examiner

TANK VALVE

BACKGROUND AND SUMMARY OF THE INVENTION

The invention relates to a tank valve and also relates to the use of such a tank valve.

A tank valve which is installed on a compressed gas container is known in the general prior art. Such a tank valve is also often referred to in English by the term "on-tank valve," or its abbreviation "OTV." Such a tank valve is a construction having a base body which has at least two sections, wherein a first base body section projects, when in the installed state, into the compressed gas container and is connected thereto in a manner which seals them together. Typically, this first base body section is screwed via an external thread into an internal thread of a corresponding receptacle of the compressed gas container. In addition to this first base body section which, in the installed state, is situated inside the compressed gas container and/or its connecting thread, the base body typically has a second base body section which is situated, in the installed state, outside of the compressed gas container. One or typically both of the base body sections also have so-called functional subgroups which are necessary for realizing the functionality of the tank valve. Such functional sub-groups may be, for example, an extraction valve, a check valve in a refueling line, a safety valve, a (manual) shut-off valve, a filter, a gas connection for a refueling and/or extraction line, or the like.

By way of example, such a tank valve can be found in the generic JP 2009-168165 A, which shows such a valve as a high-pressure valve. The generic high-pressure valve has a duel gas connection which serves both for refueling and for the removal of gas. It branches inside a base body of the tank valve into a refueling line with a first, larger cross-section and a check valve, on the one hand, and into an extraction line with a smaller cross-section and a pilot valve, on the other. The construction also has two filters for filtering out impurities from the flowing gas. One of the filters is inserted between the pilot valve and the interior of the compressed gas container in the extraction line, and the other filter is inserted in the refueling line. This construction is accordingly complex to manufacture, since the creation of different line elements having different diameters—made by drilling the line elements out of the base body—makes it necessary to re-fit the drilling tool each time. This increases the set-up times and manufacturing costs for the tank valve. Particularly for vehicular applications, this represents a significant disadvantage.

Further valves are known from US 2009/0146094 A1, for example, or—designed as pilot valves—also from EP 1 682 801 B1.

The object of the present invention is to avoid the mentioned disadvantage and to specify a reliably functioning tank valve.

The tank valve according to the invention comprises, similarly to the tank valve according to the generic prior art, a base body and an extraction valve—in particular a pilot valve—in the extraction path. According to the invention, a check valve is arranged in the extraction path in series with the extraction valve, blocking the flow against the flow direction when gas is extracted. This means that the check valve is arranged in such a manner that it prevents flow through the extraction path during refueling. The check valve therefore also serves to automatically select the flow path through the refueling line, which typically has a check valve which opens during refueling, during refueling through the refueling line, as well as through the extraction line during the extraction.

Without the check valve according to the invention, the pressure of the gas could propagate in the extraction path as well during refueling—particularly if both lines provide comparable conditions in terms of flow and pressure losses as a result of having comparable flow cross-sections. Since an extraction valve, in particular when it is constructed as a pilot valve, generally does not withstand a correspondingly high pressure difference—as typically occurs during refueling—and rather is at least temporarily pushed open by such a high pressure differential, gas could flow into the interior of the compressed gas container via this path. The gas could possibly lead to an impairment of the subsequent functioning of the extraction valve as a result of the typically high volume flow and high flow rate. This can be prevented by the check valve according to the invention, which can also be supported by a spring element in the direction opposing its desired flow path.

In addition, an inflow of gas during refueling through the extraction line would lead to gas escaping through the extraction path. This may be undesirable under certain circumstances, since a temperature sensor is typically arranged in the region in which the extraction line ends in the base body, and gas directly flows to this temperature sensor, leading to the reporting of erroneous temperature values since the gas with a direct flow has a different temperature than the gas which has mixed accordingly in the interior of the compressed gas container.

A pipe section which has a greater axial length than a temperature sensor arranged on the base body, and which is angled or curved in the tank valve screwed into the compressed gas container relative to a central axis of the compressed gas container, is arranged where the refueling line opens into the compressed gas container. Such a pipe section facilitates a function whereby, during refueling, the gas does not flow directly into the region of the temperature sensor, which would lead to the disadvantages described above, and rather flows into the compressed gas container before mixing with the gas already located inside the compressed gas container. As such, the temperature actually prevailing in the compressed gas container can be measured more reliably by the temperature sensor.

In a further advantageous embodiment of the idea according to the invention, there is a pipe burst protection in the extraction line, which prevents flow through the extraction line in the extraction direction when the back pressure drops below a threshold on the side of the pipe burst protection facing away from the interior of the compressed gas container. Such a pipe burst protection closes off the extraction line in the event that the pressure drops sharply, or there is no build-up of back pressure, in the extraction line on the side of the pipe burst protection facing away from the compressed gas container. In this case, a defect in the extraction line or components adjoining the extraction line is assumed, and the pipe burst protection automatically closes the extraction line such that no gas escapes in an uncontrolled manner from the compressed gas container as a result of the defect or leakage—such as a pipe broken off by an accident or the like, by way of example.

According to a very advantageous development of the tank valve according to the invention, a valve body of the check valve in the extraction line and/or a valve body of the pipe burst protection is lifted off a valve seat by a spring element. The check valve in the extraction line or the pipe burst protection—or, particularly preferably, both—therefore has/have a construction with a valve body and a valve seat, wherein in each case a spring element of the valve body is lifted, in normal operation, off the valve seat. If the check valve in the extraction line closes—for example, during refueling of the compressed gas container—then the pressure prevailing in the extraction line opposes the force of the spring and closes the check valve. In the case of the construction of the pipe burst protection, which is installed in a comparable manner but in a different direction of action, the valve body is held off the valve seat by the spring when the pressure is balanced or only slightly different. If the pressure on the side of the valve seat facing away from the compressed gas container drops accordingly, then the force built up by the pressure against the spring element is removed. As a result, the spring element, supported by the pressure in the compressed gas container, presses the valve body against the valve seat and thus closes the pipe burst protection. This automatically prevents the escape of gas into the region damaged by, for example, a leak or a pipe which has been broken off or torn off.

According to a very advantageous development of the tank valve according to the invention, the check valve in the extraction line and the pipe burst protection are made of the same components, installed in opposite directions. This use of the same components allows for economies of scale, especially for larger quantities, such that the costs for each individual component can be reduced accordingly. In addition to the check valve in the extraction line and the pipe burst protection being made of the same parts, the known check valve can also be constructed in the refueling line via the same components, so as to make the scaling effect even greater, thereby achieving even greater cost savings.

In an alternative, particularly advantageous development of the tank valve according to the invention, the valve body of the pipe burst protection and the check valve in the extraction line can be designed as one component. Such a component, as an integrated structure, can be an elongate component with hemispherical ends as the structures, guided in a line element via attached or integrally constructed ribs, by way of example. Of course, it is also conceivable to attach the ribs in the region of the line element, such that the integral valve body consists only of a cylindrical component having the already mentioned—for example, hemispherical or frustoconical—ends. Such an integral structure can then be supported via two spring elements, in the first direction and in the second direction, and can therefore assume the functionality of both the check valve in the extraction line and the pipe burst protection with a single component and the two spring elements. The valve seats can be designed, for example, as conical valve seats at the two ends of the line element which accommodates the integral valve body.

According to an advantageous embodiment of this idea, the valve body and/or the valve seat of the pipe burst protection also has/have a flow channel with a defined cross-section, which connects the high-pressure side with the low-pressure side even in the closed state. Such a flow channel, which can be included, for example, in the valve body and/or in the valve seat, should have, according to an advantageous development, a small flow cross-section—for example, for applications in a hydrogen tank at a nominal pressure of 70 MPa, a flow cross-section of approx. 50 to 300 μm, preferably about 200 μm. It enables pressure equalization between the high-pressure side and the low-pressure side over a longer period of operation. In a situation where the pipe burst protection has reacted defectively—for example, because of pressure fluctuations in the gas extraction region of the extraction line—a pressure equalization can take place via such a flow channel, as a kind of reset bore, such that the pipe burst protection in this case automatically reopens after a certain period of operation, and thus no maintenance is necessary to restore the desired functionality. When identical parts are used in the manner described above, the valve body and/or the valve seat of the pipe burst protection would then differ slightly, for example by such a flow channel being retrofitted to the same. The flow channel can be formed according to an advantageous development of the idea as a bore hole or, in a complementary or alternative embodiment variant, as a straight or spiral circumferential groove in both the valve body and/or the valve seat.

According to a very favorable development of the flow channel, the same can be formed by the already-existing leakage of a thread. By way of example, if the components or, in particular, the valve seat is screwed into a counter-element via a sleeve, then, if no special measures are provided for sealing the thread, an unavoidable leakage will occur through the thread. If, in particular, a thread sealant and/or thread adhesive is omitted, minimal leakage occurs between the partners of the thread. This is sufficient as a flow channel in the sense described above, such that, for example, simply omitting a sealant between the thread partners can achieve a structure with the desired flow channel. The further advantage is that there is no need for different components. As such, the identical parts concept described above can be easily maintained even with an existing flow channel.

In a further, very advantageous embodiment variant of the tank valve according to the invention, the extraction path further comprises a filter which is arranged between the extraction valve, on the one hand, and the check valve and the pipe burst protection, on the other. The arrangement of a filter in the extraction path between the check valve and the pipe burst protection, on the one hand, and the extraction valve on the other hand ensures that particles which are produced during the operation of the check valve or the extraction valve, by way of example—for example, when they are abraded off of the valve seat or valve body of either valve—do not pass into the highly-sensitive extraction valve. The construction is made very safe and reliable as a result, especially if a further filter is arranged on the opposite side of the extraction valve—for example, between the extraction valve and a gas connection in the extraction line—to make it possible to also protect the extraction valve from impurities which are brought in during refueling.

In a very advantageous embodiment of this idea, the filter, the pipe burst protection, and the check valve are assembled to form a component. Such a component, which could also be referred to as an assembly filter, can therefore comprise the filter and both of the valves. In particular, in the assembly of the individual components by screwing them together, a thread which is required anyway can be provided to form the flow channel in the above-described particularly advantageous embodiment, for pressure equalization over a longer period of operation.

In a further, very favorable embodiment of this idea, the component—that is, the assembly filter—adjoins the extraction line in the extraction path in the direction of the interior of the compressed gas container. The construction consisting of the check valve, the pipe burst protection, and the filter can therefore be mounted on the end of the extraction line on the side of the compressed gas container, and would therefore protrude into the interior of the compressed gas container after the installation of the tank valve. Depending on the length of the construction of this component, it therefore prevents gas from flowing over the temperature sensor, on the one hand. On the other hand, valuable space is saved inside the base body of the tank valve. In addition, the integration of, in particular, the pipe burst protection as a safety-critical component into the heavily-protected interior of the compressed gas container is advantageous.

In an advantageous embodiment of the tank valve according to the invention, the extraction line and the filling line can also have approximately the same flow cross-section and/or nominal diameter for flow. The line elements, which are typically formed by drilled channels inside the base body of the tank valve, therefore have the same cross-section. This simplifies the tank valve manufacturing process and ensures uniform flow through the two lines. For the refueling line, particles which may be present in the lines are moved through the lines and collect in the interior of the compressed gas container.

The decisive advantage of the tank valve according to the invention lies in the very reliable and simple functionality. This is accordingly particularly advantageous in automotive applications. Therefore, the invention specifies a use of the tank valve on a compressed gas container for storing hydrogen or natural gas, and in particular at a nominal pressure of more than 65 MPa, as fuel in a vehicle.

Further advantageous embodiments of the tank valve according to the invention, as well as its use, also emerge from the embodiment which is described in more detail below with reference to the Figures.

DETAILED DESCRIPTION OF THE DRAWINGS

Figure 1:
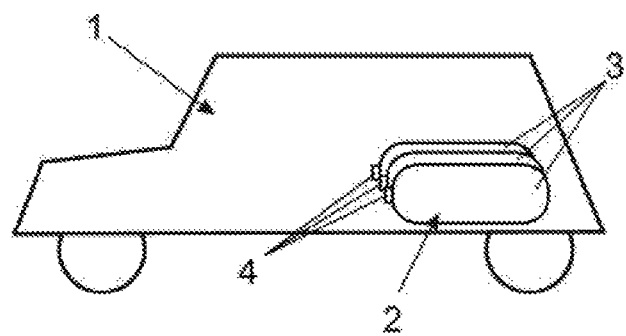
FIG. 1 shows a vehicle illustrated to show the principle, having a storage system for compressed gas as a fuel.

In the illustration of FIG. 1, a vehicle 1 is shown purely by way of example. It can be powered by a gaseous fuel, such as compressed natural gas or compressed hydrogen. For this purpose, the fuel can be converted into the power used for the drive in an internal combustion engine or—particularly if hydrogen is used—preferably in a fuel cell system. A storage device designated in its entirety by 2 is present in the vehicle 1 to store the compressed gas. It consists of several individual compressed gas containers 3, each of which carries a tank valve 4. This tank valve 4 is also referred to as an on-tank valve, or OTV for short. The individual compressed gas containers 3 can be connected to each other by means of their tank valves 4—for example, as is known from the aforementioned prior art—via a shared line, such that gas from the storage device 2 can be used in the vehicle. In particular for the storage of hydrogen—for example, for the preferred application in a fuel cell system—the nominal pressure in such compressed gas containers 3 with their tank valves 4 is typically approximately 70 MPa.

In addition to the safety requirements for the individual compressed gas containers 3 and their tank valves 4, strict demands are also made regarding both tightness and the ability to make them safely, reliably and inexpensively.

Figure 2:
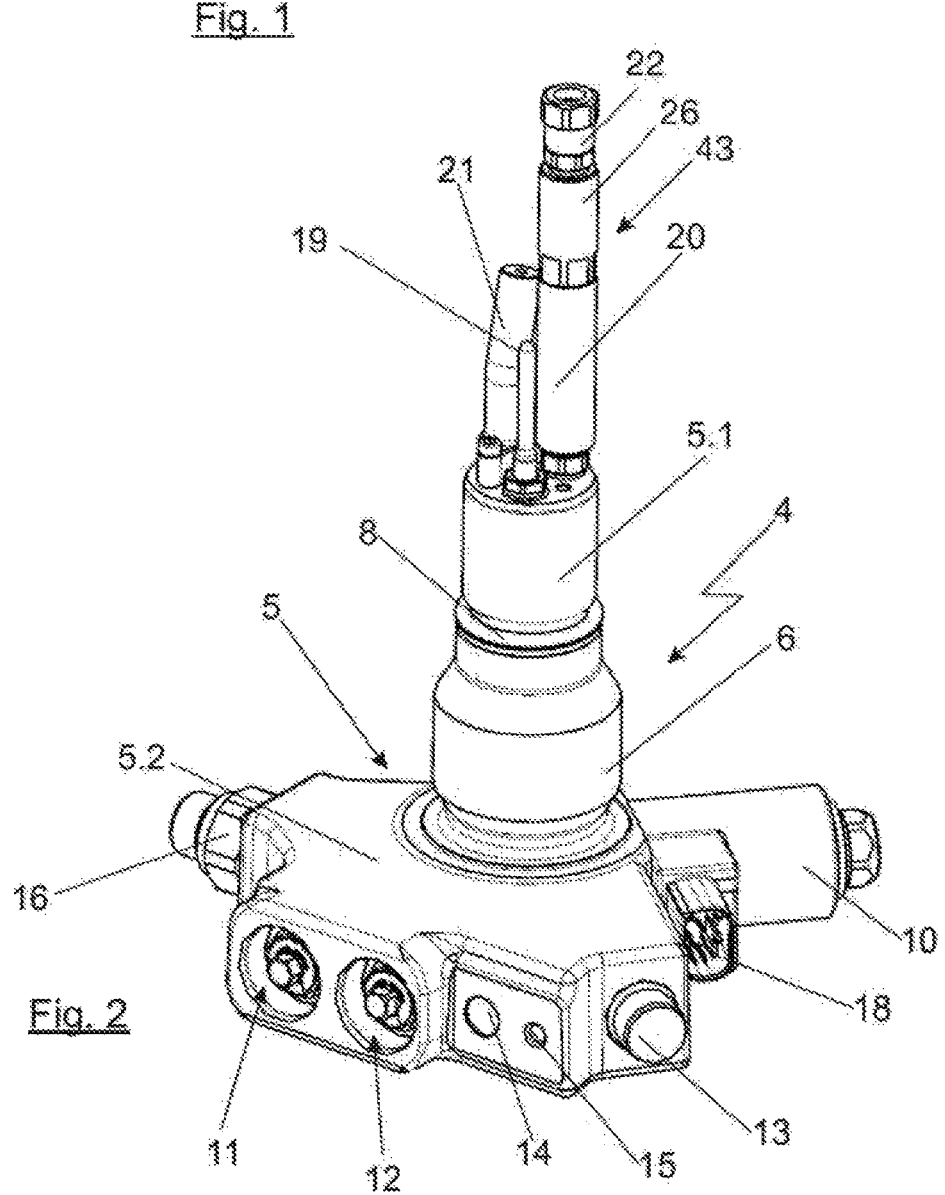
FIG. 2 shows a three-dimensional view of a possible embodiment of a tank valve according to the invention.

FIG. 2 shows a three-dimensional illustration of a tank valve 4. The tank valve 4 in this case comprises a base body 5, which substantially consists of two sections. A first base body section 5.1 is designed in such a manner that it projects into the respective compressed gas container 3 when the tank valve 4 is in the later, installed state. For this purpose, in the illustrated embodiment, it has a thread designated by 6, which cooperates with a corresponding thread in a receiving element—which is not shown—of the compressed gas container 3. This first base body section 5.1 also has a sealing device 8 indicated in the illustration of FIG. 2, made of one or more sealing rings and/or support rings, by way of example. A second base body section 5.2 can be seen in the illustration of FIG. 2 in the lower region of the tank valve 4. This second base body section 5.2 is located, after the installation of the tank valve 4, outside the compressed gas container 3. The second base body section 5.2 comprises several so-called functional subgroups of the tank valve 4. The functional subgroups in the second base body section 5.2 comprise an electromagnetically actuated pilot valve 9, as an extraction valve for removing gas from the compressed gas container 3. It is actuated by an electromagnetic coil, designated as 10. With regard to the functionality of such a pilot valve, reference may be made, by way of example, to the explanations in DE 10 2013 019 879 A1 of the applicant.

Figure 4:
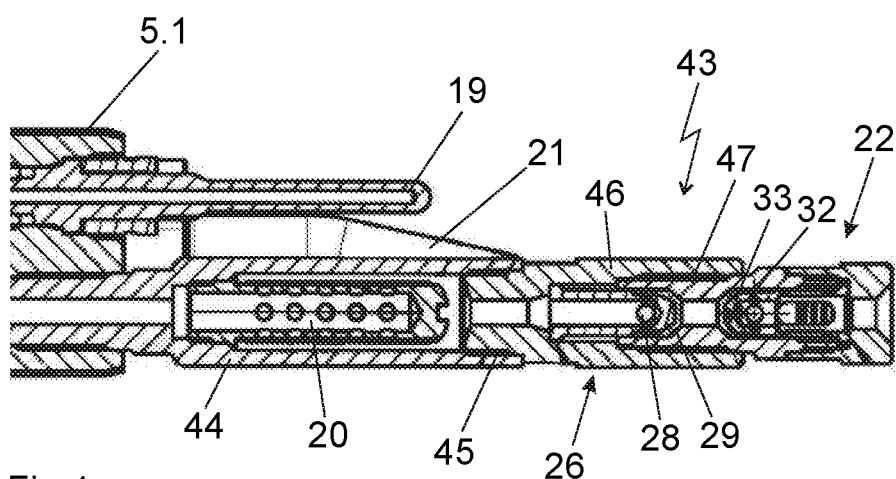
FIG. 4 shows a sectional view of a possible construction of the check valve pipe burst protection and filter.

In the illustration of FIG. 2, further functional sub-groups can be seen, integrated into the second base body section 5.2. These are, for example, two manual valves 11, 12 arranged parallel to each other, wherein the manual valve 11 is designed as a manual shut-off valve 11 and the manual valve 12 is designed as a manual emptying valve 12. This will be discussed in detail below. In addition, the part of a thermally triggered safety valve 13 can be recognized as a further functional subgroup in the second base body section 5.2. Such thermally triggered safety valves are known in principle from the general prior art. In a conventional embodiment, a screw which has a central bore hole is used here. A solder or retaining element held by a solder is situated in the central bore hole. If the region of the tank valve 4 or of the thermally triggered safety valve 13 heats up above the melting temperature of the solder, the passage bore in the screw is opened and the gas permanently in contact with the screw inside the compressed gas container 13 can flow out. An alternative to this, which is used very frequently, in particular in the European and American markets, is a structure in which a valve body is held in position by a glass ampoule with a low-boiling liquid. The boiling point of the liquid in the glass ampoule is tuned in such a manner that it begins to boil at a critical temperature of the thermally triggered safety valve 13. The volume increase during boiling destroys the glass ampoule and releases the valve body from the valve seat. The pressure of the gas in the compressed gas container prevailing at the valve body moves the same into an open position, away from the valve seat, such that the gas can flow out of the compressed gas container 3. In the illustration of FIGS. 2 and 4, an exhaust line designated by 14 serves this purpose. It is connected to the interior of the compressed gas container 3 when the thermally triggered safety valve 13 is activated. A threaded bore, designated by 15 in the Figures, which is suitable for receiving a screw, is located next to the exhaust line 14 and/or its opening in the second base body section 5.2 of the tank valve 4. At this position, a so-called exhaust line or venting tube can be simply and reliably bolted on—for example, in the manner as described in German patent application DE 10 2013 015 515 A1 of the Applicant.

A gas connection 16 can be seen in the illustration of FIG. 2 in the region of the second base body section 5.2, as a further functional subgroup. This gas connection 16 is for the extraction of gas from the compressed gas container 3 via the pilot valve 9 and the refueling of the compressed gas container 3. It can also have a filter 17, which is described in more detail below. A further element recognizable in the illustration of FIG. 2, in the region of the second base body section 5.2 and/or in the region of the electromagnetic coil 10, is a plug-in connection designated by 18, via which, on the one hand, the electromagnetic coil 10 and thus the pilot valve 9, and on the other hand, measurement data, such as data from a temperature sensor designated by 19, can be transmitted. In particular, the tank valve 4 in this case comprises the electrical plug-in connection 18 as the only electrical connection, such that the wiring of the storage device 2 is accordingly simple and efficient.

Also, a slightly curved pipe section 21 can be seen next to the temperature sensor 19, in the region of the first base body section 5.1, mounted on the same in the direction of the interior of the compressed gas container 3. Its design is chosen so that it distributes the inflowing gas into the compressed gas container 3 during refueling of the compressed gas container 3, so that, as much as possible, there is a mixing of the gas and thus a reliable measurement of the temperature by the temperature sensor 19. An outlet opening 42 of the bent tube section 21 is ideally narrowed relative to its nominal diameter in the flow cross-section, in order to promote the formation of a jet of the inflowing gas and thus to further improve the mixing of the gas in the interior of the compressed gas container 3.

On the first base body section 5.1, a component denoted by 43 can also be seen in the illustration of FIG. 2, and is assembled from several individual parts. This component 43, which will also be referred to below as an assembly filter 43, comprises a filter 20, a pipe burst protection 22, and a check valve 26—which will be discussed in more detail further below. A detailed illustration of the assembly filter 43 can also be found in FIG. 4, which will be discussed further below. Further functional subgroups can also be designed to be integrated in the interior of the first base body section 5.1.

Figure 3:
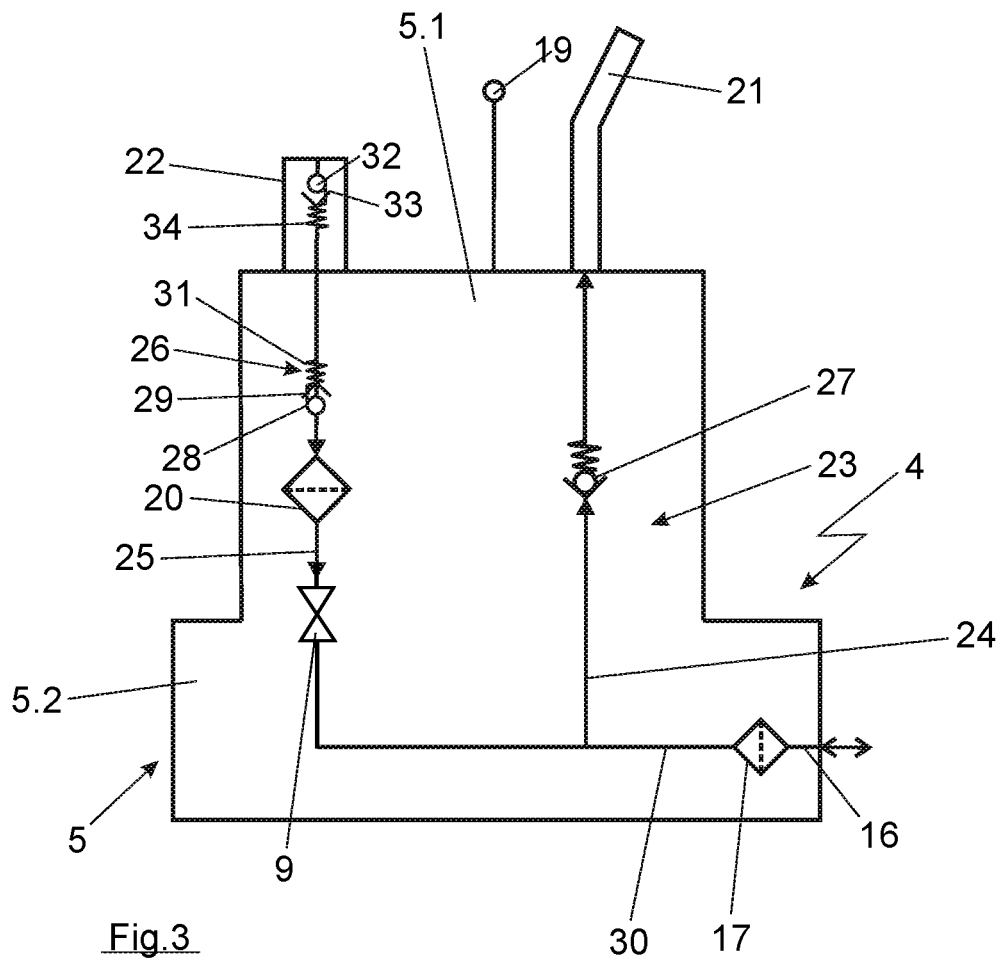
FIG. 3 shows a schematic illustration of a possible arrangement according to the invention in a pneumatic flow diagram.

In the illustration of FIG. 3, the part of the tank valve 4 relevant to the invention is shown schematically again in a pneumatic flow diagram. The tank valve 4 in turn consists of the base body designated by 5, which is divided into the two base body sections 5.1 and 5.2. For the refueling and for the extraction of gas, the tank valve 4 can be connected via the gas connection 16, as was seen in FIG. 2, to a line system which connects the compressed gas container equipped with the tank valve 4 to a refueling line and a consumer and/or further compressed gas containers 3 of the storage device 2.

The filter 17 connects to the gas connection 16. It is further guided via a line section 30 in the base body 5, and then branches into a refueling line 24 and an extraction line 25. Both lines have the same flow cross-section. This makes, in particular, the production of the line elements 24, 25, which are typically drilled into the base body 5, particularly simple. The refueling line 24 leads to the already mentioned pipe section 21, and has a check valve 23. This check valve 23 is pressed against the force of a spring element 27 during the refueling process, such that the gas can flow into the compressed gas container 3 during refueling through the pipe section 21. As already mentioned, the inflow is guided past the temperature sensor 19 through the pipe section 21, such that it measures the temperature of the gas mixture forming in the compressed gas container 3 and not the temperature of the directly flowing gas.

The extraction line 25 also runs through the base body 5 and ends in the region of the assembly filter 43, which is arranged in the extraction path in the region of the connection of the extraction line 25 with the interior of the compressed gas container 3, as can be seen in the illustration of FIG. 2. The extraction line 25, which is designed as the part of the extraction path running in the base body 5 after the branching of the line section 30, has the pilot valve 9 as an extraction valve 9, which works for example in the manner cited in the aforementioned German patent application. Moreover, another check valve 26 is included in the extraction path.

The check valve 26 has a valve body 28 and a valve seat 29. The valve body 28 is lifted off the valve seat 29 via a spring element 31 whenever the compressed gas container 2 is not being refueled. As a result of this, when the gas is extracted via the pilot valve 9 as the extraction valve 9, the flow path is freed by the force of the spring element 31 to facilitate flow. In the reverse flow direction—that is, if pressure is exerted, due to a refueling of the compressed gas container 3 via the gas connection 16, against the check valve 26—then the latter is closed by the overpressure acting against the force of the spring element 31, by the valve body 28 being pressed onto the valve seat 29. This is useful and necessary because the pilot valve 9 would allow gas at higher pressure differences—for example, more than 5 to 10 bar of differential pressure—to pass through. However, this is undesirable because the high flow volume, on the one hand, raises the concern of an impairment of the pilot valve 9—for example, due to the flow damaging or wearing the sealing lips or the like—and on the other hand, gas flowing through the extraction line 25 into the compressed gas container 3 would escape in the base body section 5.2 in the region of the end of the extraction line 25. The gas would then pass directly into the region of the temperature sensor 19 and would falsify the temperature values at that position, since the temperature of the gas entering the compressed gas container 3 directly during refueling would then be primarily measured. This is especially true if the assembly filter 43 is not present, contrary to the illustration in FIG. 2. The check valve 26, the pipe burst protection 22, and the filter 20 can also be wholly or partially integrated in the base body 5 and/or the first base body section 5.2, as is indicated as a partial integration in the illustration of FIG. 3. For precisely this application, a falsification of the temperature value of the temperature sensor 19 may occur. If the assembly filter 43 is used, this can probably be largely ruled out. Nevertheless, it is desirable to measure the temperature of the gas in the tank—in particular, the gas which flows in via the pipe section 21 and mixes with the residual gas already present in the tank—such that the desired average temperature of the gas can be measured in the region of the temperature sensor 19.

The pipe burst protection 22 mentioned above, which can also be seen in the illustration of FIG. 2, can be seen in the extraction line 25—or mounted on the first base body section 5.1 towards the interior of the compressed gas container as part of the extraction path 3. The pipe burst protection 22 can be constructed in any manner, and is fundamentally known in the field of compressed gas storage. In particular, it may be designed in such a manner that a valve body 32 is lifted off a valve seat 33 by a spring element 34 in normal operation with balanced pressure on both sides of the valve body 32. If there is a pressure drop on the side of the valve body 32 facing away from the compressed gas container 3, then the internal pressure from the compressed gas container presses the valve body 32 against the force of the spring element 34 onto the valve seat 33, and thus securely and reliably closes the extraction line 25. Such a safety-relevant closing of the extraction line 25 occurs, for example, when the second base body section 5.2 of the tank valve 4 is sheared off—for example, in an accident. In this case, the escape of gas can be prevented via the pipe burst protection 22. The same applies in the event that a line element is torn off—for example, behind the gas connection 16 or at another location in the storage device 2, which also leads to a decrease in the pressure in the extraction path and thus to a closing of the pipe burst protection 22. The illustration in FIG. 3 shows a structure which is partially integrated into the base body 5, in which the filter 20 and the check valve 26 are constructed as integral parts in the first base body section 5.1. The pipe burst protection 22 is installed in the base body section 5.1 in a part of the extraction path which extends the extraction line 25 in the direction of the interior of the compressed gas container 3. The pipe burst protection 22 could just as well be integrated into the base body section 5.1, or it could be mounted, together with the other components in the manner of the above-mentioned assembly filter 43, in such a manner that the filter 20, as well as the pipe burst protection 22 and the check valve 26, are situated in the part of the extraction path which connects to the extraction line 25 in the direction of the interior of the compressed gas container. The components then protrude into the interior of the compressed gas container. There they are also relatively safe in the event of an accident.

The pipe burst protection 22 and the check valve 26, and in particular also the check valve 23, can be constructed from the same components. This makes it possible to use greater quantities of the same components. This has corresponding advantages for the manufacturing costs of these components and thus helps to reduce the overall cost of the tank valve.

Ideally, the valve body 32 or the valve seat 33, or possibly both—something which is generally not necessary—additionally have a flow channel with a defined, small cross-section, for example approximately 200 µm nominal diameter. This can be implemented, for example, by a bore hole or a groove. In the event that the pipe burst protection 22 has reacted undesirably to a pressure fluctuation, this flow channel leads to a pressure equalization between the two sides of the valve body 32 of the pipe burst protection 22, such that it returns to its desired initial state, in which the spring element 34 lifts the valve body 32 off the valve seat 33, as soon as the pressure is balanced after a longer time. This flow channel is also known as a reset channel. It is small enough in this case that, in the event of a broken pipe, the volume of gas flowing through this flow channel is not safety critical.

The illustration of FIG. 4 shows a sectional view of the assembly filter 43. It substantially consists of a filter housing 44 which shows the filter 20 in its interior. This filter housing 44 is screwed into and seals with a corresponding bore hole in the first base body section 5.1. In this case, screwing into the thread with a tight seal is necessary to prevent dirt from bypassing the filter 20. When the filter housing 44 is screwed in, the check valve 26 adjoins the filter 20. The check valve 26 comprises, together with the pipe burst protection 22, the valve seats 29, 33, which are arranged in this case as a single piece in the screwed-in element which comprises the pipe burst protection 22. Ideally, the structure may be designed in such a manner that the valve seats 29, 33 are made of a plastic material, such as PEEK. The valve bodies 28, 32, designed here as pistons, can accordingly be made of a metallic material—for example, of steel.

The exemplary structure of the assembly filter 43 shown here has a thread between the filter housing 44 and the check valve 26. In the illustration of FIG. 4, this thread is indicated by the reference numeral 45. A further thread is located between the part which comprises the valve seats 29, 33 and a housing 46 of the check valve 26. This thread is designated in the illustration of FIG. 4 by the reference numeral 47. At this point, the two threads 45, 47 each form a bypass around the pipe burst protection 22, as long as they do not seal completely tightly. Specifically this effect may be desired in the present case. The entry of particles through this bypass is not critical, since the filter 20 follows in these potential flow paths in the direction of the outflowing gas through the threads 45, 47. Therefore, according to an advantageous embodiment, at least one of these two threads 45, 47 can be configured without a thread sealant. As such, during installation, there is necessarily a minimal leakage through one of the threads 45, 47—for example, because metal lies against metal or metal lies against plastic in this case—and a complete seal is not intended. This leakage through the threads 45, 47, which accordingly may occur in one or in both of the threads 45, 47, can then replace the above-mentioned flow channel as a reset channel, such that no separate flow channel need be included in the construction of the check valve 26 and the pipe burst protection 22. This is a considerable advantage in terms of production, since an accordingly small flow channel with a flow cross-section of, for example, 200 µm is accordingly complicated to create during manufacture. Nevertheless, its installation in the region of the pipe burst protection 22 can also be contemplated here, in principle.

In addition to the use of identical parts, with the exception of the reset bore, for example in the valve body 32, and the simply-reversed installation of these parts, in one case as a check valve 26 and in the other case as a pipe burst protection 22, it is also conceivable that the pipe burst protection 22 and the check valve 26 are implemented as a single construction. Such a construction is indicated by way of example in the illustration of FIGS. 4 and 5. The combined pipe burst protection 22 and check valve 26 have an integral structure 35 for this purpose, which is substantially cylindrical and carries the valve bodies 28 and 32 at its two ends. These are each formed in the illustration of FIG. 5 with a hemispherical shape, and sit at the ends of the integral structure 35. In particular, they are designed as a single piece together with this integral structure 35. An extended line section 36, which has a slightly greater diameter than the integral structure 35, encloses the structure 35, such that, in the open state of the pipe burst protection 22 and the check valve 26, the gas can flow around this integral structure 35. It is supported by individual ribs 37, as can be seen in particular in the sectional view in FIG. 6, on the walls of the extended line section 36, and is guided in this manner.

Figure 5:
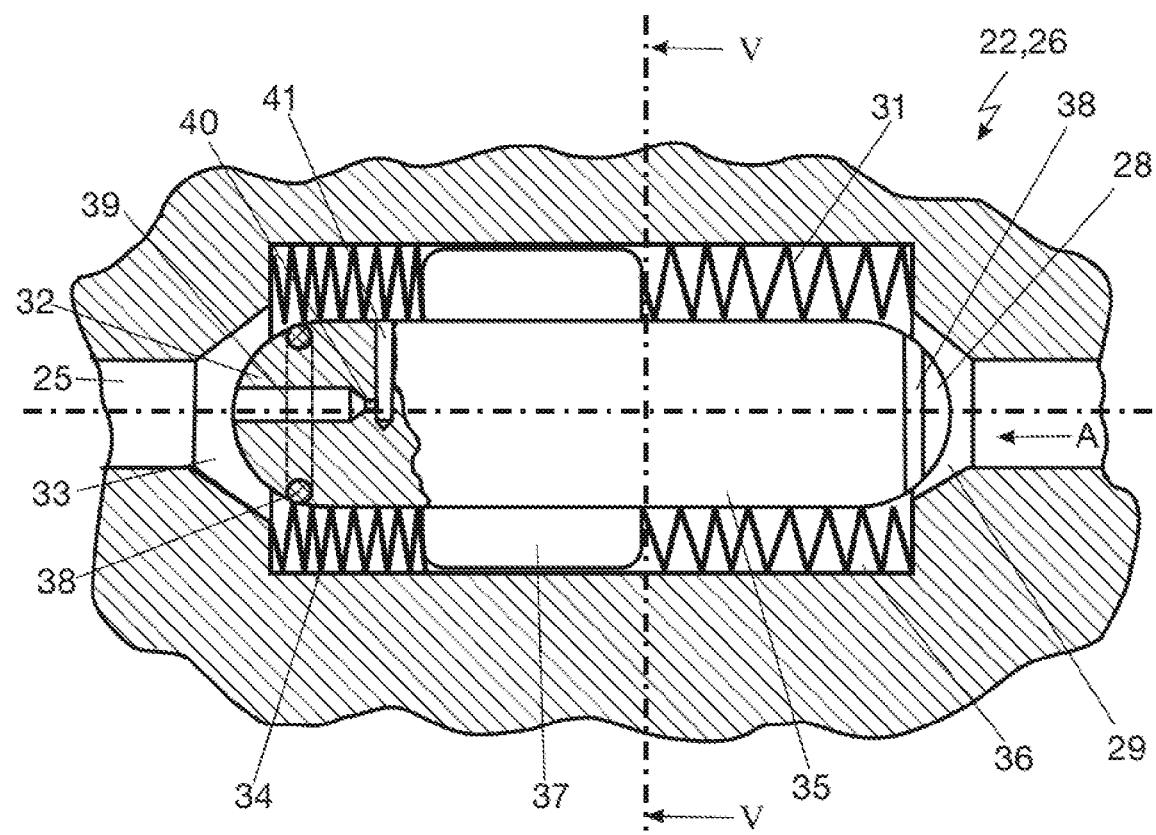
FIG. 5 shows a schematic sectional view through a combined construction of the pipe burst protection and check valve.
Figure 6:
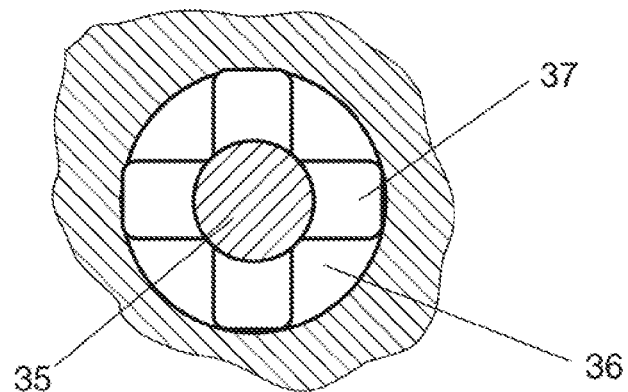
FIG. 6 shows a schematic sectional view along the line VI-VI in FIG. 5.

In the illustration of FIG. 5, the flow direction during the extraction of gas is indicated by an arrow designated as A, in the region of the extraction line 25, of which the widened line section 36 is a part. The two spring elements 34 and 31 of the pipe burst protection 22 and the check valve 26, respectively, are supported in this case around the circumference of the respective valve seats 29 and 33 by the material surrounding the extended line section 36, on one side, and by the ribs 37 on the other side. The construction is therefore extremely simple, and can be efficiently assembled—if, contrary to the schematic illustration in FIG. 5, by way of example, one of the valve seats 29, 33 can be screwed in, or the line section 36 as a whole can be divided and can be installed by press-fitting or screwing, for example. The illustration of FIG. 5 also shows a sealing element 38 in the region of the valve body 28, and a sealing element 38 on the integral structure 35 in the region of the valve body 32. These sealing elements 38 improve the contact of the valve bodies 32, 28 against the respective valve seats 33, 29 and thus improve the seal.

The flow channel is realized as a reset channel in the illustration of FIG. 5, purely by way of example, by bore holes in the region of the valve body 32. A first axial bore hole 39 narrows to the defined flow cross-section in the region of a bore hole, designated by 40, having a diameter of only 150 µm, by way of example. The latter opens into a radial bore hole 41 and thus allows the gas to flow through the valve of the pipe burst protection 22, even in the event that the valve body 32 is contacting and seals against the valve seat 33. The bore hole 40 in the illustration of FIG. 5 therefore forms the flow channel which has a defined cross-section to reset the pipe burst protection 22 after a defective reaction, if necessary. As an alternative to this construction, it would of course also be conceivable to use a groove for example, in the valve seat 33 or on the valve body 32. In particular, especially in the case of a seal without the sealing element 38 in the region of the valve seat 32, a helical groove could be created in the region of the valve body 32—for example, by using a cutting tool during the manufacture of the integral structure 35. This could also form a corresponding flow channel, in the same way as the flow channel formed by the bore holes 39, 40, 41—with the bore hole 40 limiting the cross-section. As an alternative to this, a likewise spiral-shaped groove in the region of the valve seat 33 can be contemplated. Grooves running axially both in the valve seat 33 and in the valve body 32 can also be contemplated. However, these are more difficult to produce with the desired precision during manufacture, compared to a spiral groove. Also, mounting the entire construction which can be seen in the illustration of FIG. 5—for example, directly on the filter 20 or via a filter housing 44, analogously to the illustration in FIG. 4—can be contemplated. In this case, the thread could also form the flow channel, as a reset channel, for such an assembly, as has been explained above in the explanation of the threads indicated as 45 and 47 in FIG. 4.

The construction with the integral structure 35 is particularly simple and efficient because it combines the functionality of two components into one component. In particular, it can be realized, during the installation on the tank valve, analogously to the illustration in FIG. 2, in such a manner that a part of the extended line section 36 is inserted into the first base body section 5.1 of the base body 5, and the other part of the extended line section 36 is realized by a screwed-on element, such as can be seen in the illustration of FIG. 2, in principle, wherein this element can then also comprise the filter 20.

The invention claimed is:

1. A tank valve for installation on a compressed gas container, comprising:
 a base body having a shared gas connection for refueling and extraction which is divided inside the base body into a refueling line and an extraction line as part of an extraction path and having an extraction valve in the extraction line;
 wherein a first check valve is disposed in the extraction path in series with the extraction valve and wherein the first check valve blocks a flow opposite to a flow direction during extraction of gas;
 wherein a pipe burst protection is disposed in the extraction path;
 wherein a respective valve body of the first check valve and of the pipe burst protection is lifted off a respective valve seat via a respective spring element during normal operation.

2. The tank valve according to claim 1, wherein the first check valve and the pipe burst protection are made of the same components installed in opposite directions.

3. The tank valve according to claim 2, wherein a second check valve in the refueling line is also made of the same components as the first check valve and the pipe burst protection.

4. The tank valve according to claim 1, wherein the respective valve bodies are configured as a single piece together with an integral structure.

5. The tank valve according to claim 1, wherein the valve body and/or the valve seat of the pipe burst protection has a flow channel with a defined cross-section.

6. The tank valve according to claim 5, wherein the flow channel is formed by bore holes.

7. The tank valve according to claim 5, wherein the flow channel is formed as a circumferential groove.

8. The tank valve according to claim 5, wherein the flow channel is formed by a leakage of a thread.

9. The tank valve according to claim 1, wherein the extraction path further comprises a filter which is disposed between the extraction valve and the first check valve.

10. The tank valve according to claim 9, wherein the filter, the first check valve, and the pipe burst protection are assembled to form one component.

11. The tank valve according to claim 1, wherein the extraction line and the refueling line have a same nominal diameter of associated line elements through which gas can flow.

12. A use of the tank valve according to claim 1 on a compressed gas container used for storing hydrogen or natural gas as fuel in a vehicle.

13. The use according to claim 12, wherein the hydrogen or the natural gas is stored in the compressed gas container at a nominal pressure of more than 65 MPa.

* * * * *